United States Patent
Nakamura (10) Patent No.: US 10,769,486 B2
(45) Date of Patent: Sep. 8, 2020

(54) IMAGE PROCESSING APPARATUS, BINARY IMAGE PRODUCTION METHOD, AND IMAGE PROCESSING PROGRAM

(71) Applicant: SEIKO EPSON CORPORATION, Tokyo (JP)

(72) Inventor: Tomohiro Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 16/128,566

(22) Filed: Sep. 12, 2018

(65) Prior Publication Data

US 2019/0080199 A1 Mar. 14, 2019

(30) Foreign Application Priority Data

Sep. 14, 2017 (JP) ................................ 2017-176457

(51) Int. Cl.

| | |
|---|---|
| *G06K 9/46* | (2006.01) |
| *G06K 9/38* | (2006.01) |
| *G06T 7/136* | (2017.01) |
| *G06T 7/181* | (2017.01) |
| *G06T 7/13* | (2017.01) |
| *G06T 7/11* | (2017.01) |

(Continued)

(52) U.S. Cl.
CPC ............. *G06K 9/4661* (2013.01); *G06K 9/38* (2013.01); *G06K 9/4604* (2013.01); *G06T 7/11* (2017.01); *G06T 7/13* (2017.01); *G06T 7/136* (2017.01); *G06T 7/181* (2017.01); *G06T 11/001* (2013.01); *G06K 2209/01* (2013.01); *G06T 7/12* (2017.01)

(58) Field of Classification Search
CPC ...... G06K 9/4661; G06K 9/4604; G06K 9/38; G06K 2209/01; G06T 7/181; G06T 7/136; G06T 11/001; G06T 7/11; G06T 7/13; G06T 7/12
See application file for complete search history.

(56) References Cited

U.S. PATENT DOCUMENTS 8,774,524 B2 * 7/2014 Tsunematsu ......... G06K 9/4638
                                                       382/197
8,818,095 B2    8/2014 Du
                        (Continued)

FOREIGN PATENT DOCUMENTS

JP         2010-225047 A      10/2010

OTHER PUBLICATIONS

Chun Che Fung et al: "A Review of Evaluation of Optimal Binarization Technique for Character Segmentation in Historical Manuscripts", Knowledge Discovery and Data Mining, 2010. WKDD *10. Third International Conference on, Jan. 1, 2010 (Jan. 1, 2010).*

(Continued)

*Primary Examiner* — Asghar H Bilgrami
(74) *Attorney, Agent, or Firm* — Global IP Counselors, LLP (57) ABSTRACT

Provided is an image processing apparatus including an acquisition unit configured to acquire a multi-valued image and a binarization unit configured to generate a binary image obtained by binarizing the multi-valued image, and the stated image processing apparatus is configured such that the binarization unit detects a closed region within the multi-valued image, and binarizes the inside of the closed region based on luminance inside the closed region and luminance around the closed region.

11 Claims, 8 Drawing Sheets

(51) Int. Cl.
  *G06T 11/00*  (2006.01)
  *G06T 7/90*   (2017.01)
  *G06T 7/12*   (2017.01)

(56) References Cited

U.S. PATENT DOCUMENTS

| | | | | |
|---|---|---|---|---|
| 9,807,280 | B2* | 10/2017 | Misawa | G06K 9/44 |
| 10,509,023 | B2* | 12/2019 | Ichitani | G06T 7/11 |
| 2006/0171587 | A1* | 8/2006 | Kanatsu | G06K 9/00456 |
| | | | | 382/173 |
| 2009/0208126 | A1* | 8/2009 | Matsumoto | H04N 19/60 |
| | | | | 382/244 |
| 2013/0044952 | A1* | 2/2013 | Du | G06K 9/38 |
| | | | | 382/170 |
| 2018/0300861 | A1* | 10/2018 | Tsarenko | G06T 5/40 |

OTHER PUBLICATIONS

Qiang Chen et al.; "A double-threshold image binarization method based on edge detector"; Pattern Recognition; vol. 41. No. 4, Apr. 1, 2008; pp. 1254-1267.

J.R. Parker et al.; "Thresholding using an illumination model"; Document Analysis and Recognition, 1993., Proceedings of the Second in Ternational Conference on Tsukuba Science City, Japan; Jan. 1, 1993; pp. 270-273.

Chun Che Fung et al.; "A Review of Evaluation of Optimal Binarization Technique for Character Segmentation in Historical Manuscripts"; Knowledge Discovery and Data Mining, 2010, WKDD '10. Third International Conference on; Jan. 1, 2010; pp. 236-240.

The Partial European Search Report for the corresponding European Patent Application No. 18194614.6 dated Feb. 20, 2019.

\* cited by examiner

| Pr | Pr | Pr |
|----|----|----|
| Pr | Pi |    |

FIG. 4

|    | Pr |    |
|----|----|----|
| Pr | Pi |    |

| 1 | 1 | 1 | 1 | 1 | 2 | 3 | 3 |
|---|---|---|---|---|---|---|---|
| 1 | 1 | 1 | 4 | 2 |   |   |   |
|   |   |   |   |   |   |   |   |

FIG. 6

| 1 | 1 | 1 | 1 | 1 | 2 | 3 | 3 |
|---|---|---|---|---|---|---|---|
| 1 | 1 | 1 | 2 | 2 | 2 | 3 | 3 |
| 1 | 1 | 1 | 2 | 2 | 2 | 3 | 3 |

IMAGE PROCESSING APPARATUS, BINARY IMAGE PRODUCTION METHOD, AND IMAGE PROCESSING PROGRAM

BACKGROUND

1. Technical Field

The present invention relates to image processing apparatuses, binary image production methods, and image processing programs.

2. Related Art

A technique of converting a multi-valued image into a binary image has been known. For example, JP-A-2010-225047 discloses a technique in which a threshold value is determined based on a luminance histogram of a region to be binarized, and a pixel having luminance higher than the threshold value is binarized to a white color and a pixel having luminance lower than the threshold value is binarized to a black color.

However, in this method, an object such as a character included in a multi-valued image is merged with a background in some case.

SUMMARY

An image processing apparatus is an image processing apparatus including an acquisition unit configured to acquire a multi-valued image and a binarization unit configured to generate a binary image obtained by binarizing the multi-valued image, where the binarization unit detects a closed region within the multi-valued image, and binarizes the inside of the closed region based on luminance inside the closed region and luminance around the closed region. According to this configuration, it is possible to change binarization processing based on the luminance inside the closed region and the luminance around the closed region. Therefore, for example, it is possible to perform binarization processing in accordance with a case in which a difference between the luminance inside the closed region and the luminance around the closed region is large and a case in which the stated difference is small.

Further, a configuration may be adopted in which, when luminance of a major portion inside the closed region is darker than the luminance around the closed region, the binarization unit performs binarization to make the major portion of the closed region be black, and when the luminance of the major portion inside the closed region is brighter than the luminance around the closed region, the binarization unit performs binarization to make the major portion of the closed region be white. According to this configuration, the major portion inside the closed region can be binarized without being merged with its periphery.

Further, the binarization unit may be configured to binarize the inside of the closed region based on characteristics of the shape of the closed region. According to this configuration, it is possible to increase a possibility that an object (e.g., a character or the like) included in the multi-valued image can be binarized being differentiated from the peripheral region thereof.

Further, the binarization unit may be configured such that, when the closed region is smaller than a reference size or thinner than a reference shape, the inside of the closed region is binarized based on the luminance inside the closed region and the luminance around the closed region, and when the closed region is larger than the reference size and thicker than the reference shape, the inside of the closed region is binarized based on the luminance inside the closed region without the luminance around the closed region being referred to. According to this configuration, it is possible to binarize a closed region that is considerably likely to be a characteristic object such as a character, based on luminance around the closed region, and to binarize a closed region that is unlikely to be an object by a simple method not referring to the luminance around the closed region.

Further, the binarization unit may be configured such that, in a case where a length of a side of a rectangle circumscribing the closed region is less than a first reference and a length of another side of the rectangle is less than a second reference, the closed region is determined to be smaller than the reference size. According to this configuration, it is possible to easily identify a closed region that should not be merged with the peripheral region thereof by binarization.

Further, the binarization unit may be so configured as to determine whether or not the closed region is thinner than the reference shape based on a ratio of the length of one side of the rectangle to the length of another side of the rectangle. According to this configuration, it is possible to easily identify a closed region that should not be merged with the peripheral region thereof by binarization.

Further, the binarization unit may be so configured as to determine whether or not the closed region is thinner than the reference shape based on a ratio of an area of the closed region to an area of the rectangle. According to this configuration, it is possible to easily identify a closed region that should not be merged with the peripheral region thereof by binarization.

Further, the binarization unit may be so configured as to determine a pixel of interest to be an edge when a luminance distribution range in the pixel of interest and pixels around the pixel of interest is larger than a reference value, and to detect a closed region based on the determined edge. According to this configuration, it is possible to recognize an object with a small luminance change, as the identical closed region.

Further, the binarization unit may detect, as a closed region, a region formed by a continuous edge and a region in which non-edge pixels, which are not the edge, are continuously formed. According to this configuration, it is possible to, easily identify a closed region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, embodiments of the invention will be described in the following order:
1. Configuration of Scanner
2. Binarization Processing
3. Other Embodiments

1. Configuration of Scanner

Figure 1:
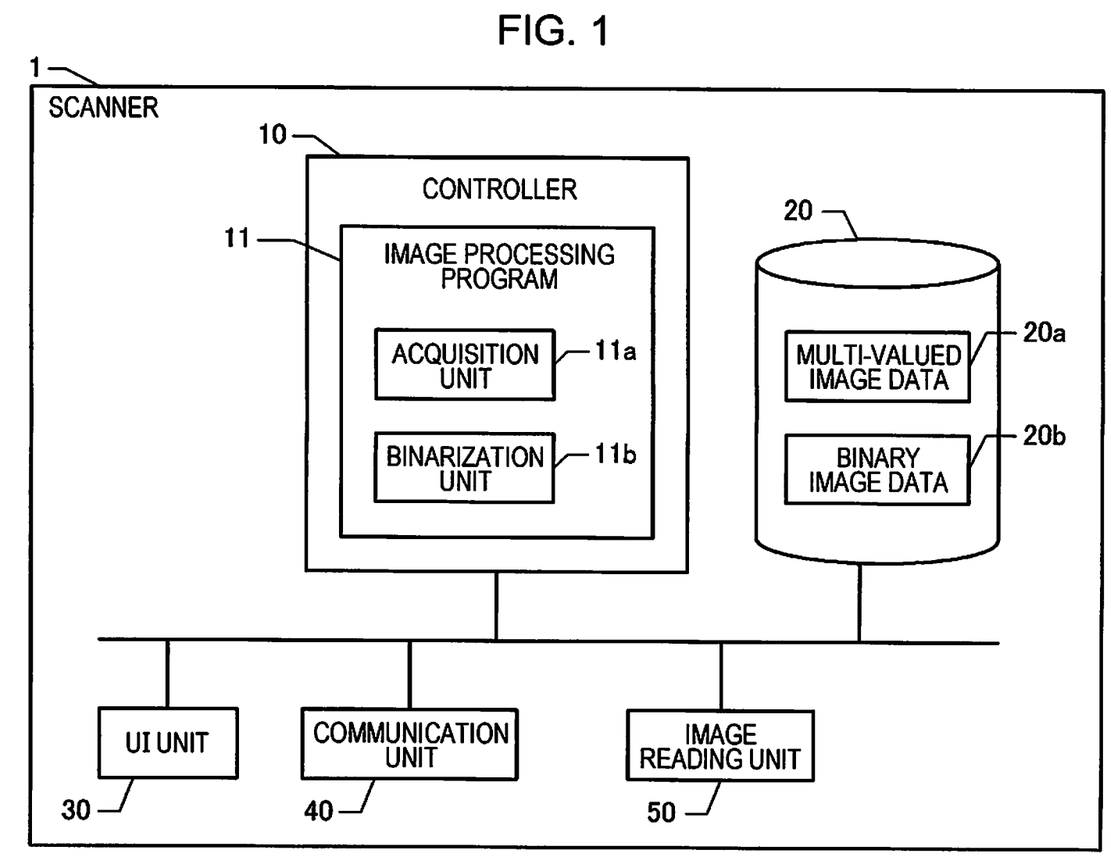
FIG. 1 is a block diagram of a scanner.

FIG. 1 is a block diagram illustrating a configuration of a scanner 1 that functions as an image processing apparatus according to an embodiment of the invention. The scanner 1 includes a controller 10, a memory 20, a UI (User Interface) unit 30, a communication unit 40, and an image reading unit 50.

The UI unit 30 includes a touch panel type display, a key input section, and the like. The display includes a display panel and a touch detection panel overlaid on the display panel. The display displays various information on the display panel under the control of the controller 10. In addition, the display detects a contact by the finger or the like of a person to the touch detection panel, and then outputs the contact coordinates to the controller 10. When the key input section detects an operation on a key such as a power button, a start button, a cancel button, or a numeric button, the key input section outputs, to the controller 10, key operation information indicating the operated key.

The communication unit 40 includes a removable memory, a communication interface circuit for communicating with an external device in accordance with various communication protocols, and the like. The image reading unit 50 includes a well-known color image sensor configured to emit light onto a document and receive reflected light from the document as read data, a light source, a mechanical component, and the like. In this embodiment, the image reading unit 50 can read an image as multi-tone data of a plurality of color channels. Accordingly, the image outputted from the image reading unit 50 is a multi-valued image.

In the memory 20, multi-valued image data 20a indicating the multi-valued image read by the image reading unit 50, binary image data 20b obtained by binarizing the multi-valued image indicated by the multi-valued image data 20a, and the like can be recorded.

The controller 10 can acquire the operation content of a user based on the information acquired from the UI unit 30, and can carry out processing corresponding to the above operation content. Processing that the controller 10 can carry out includes various kinds of processing including, for example, an instruction for reading in the image reading unit 50, an instruction for binarizing the read multi-valued image, an instruction for transmitting the read multi-valued image, the binarized binary image or the like to the removable memory, the external device, and the like. Needless to say, the scanner 1 may be controlled by an external device (e.g., another computer, a portable terminal, or the like) connected to the scanner 1.

The controller 10 includes a CPU, a RAM, and the like, and implements each function of the scanner 1 by executing various programs recorded in the memory 20. The various programs executed by the controller 10 include an image processing program 11 for causing the controller 10 to implement a function of binarizing the multi-valued image read by the image reading unit 50. The image processing program 11 for performing the binarization is executed for the purpose of reading, with a small amount of data, a document sheet or the like in which characters whose readability is important are written, for example.

To implement the above function, the image processing program 11 includes an acquisition unit 11a and a binarization unit 11b. The acquisition unit 11a is a program module that causes the controller 10 to perform a function of acquiring a multi-valued image. In other words, the controller 10 controls the image reading unit 50 using the function of the acquisition unit 11a, and reads a document (which may be a document transported by an ADF) placed on a document table of the scanner 1 to acquire a multi-valued image. The acquired multi-valued image is recorded as the multi-valued image data 20a in the memory 20.

The binarization unit 11b is a program module that causes the controller 10 to perform a function of generating a binary image obtained by binarizing a multi-valued image. In other words, the controller 10 acquires the multi-valued image data 20a from the memory 20 using the function of the binarization unit 11b, and generates the binary image data 20b obtained by binarizing the tone of each pixel of the multi-valued image data 20a. In this embodiment, when a luminance value of the multi-valued image is equal to or larger than a threshold value, the controller 10 takes a value of 1, and takes a value of 0 when the luminance value is smaller than the threshold value, thereby converting the multi-valued image to the binary image.

As described above, since the tone of the multi-valued image is converted to 1 or 0 based on the threshold value, if the threshold value is inappropriate, an object to be read, such as a character, may be merged with the peripheral region thereof. For example, in the case where there is a bright region around a thin (high luminance) character, if the threshold value is less than the luminance of the character, the character and its peripheral region will be merged. In the case where a dark region exists around a dark (low luminance) character, if the threshold value is larger than the luminance of the character, the character and the peripheral region will also be merged.

Then, in this embodiment, the binarization unit 11b causes the controller 10 to perform a function of adjusting the threshold value in accordance with the content of the multi-valued image. Specifically, the controller 10 detects a closed region in the multi-valued image. In this embodiment, a closed region is a region that can be recognized as a continuous region in a multi-valued image, and has a possibility of being an object that should be distinguished from its peripheral region in the binarization. In this embodiment, the controller 10 identifies characteristics of each pixel in the multi-valued image to identify a region formed continuously by the pixels having common characteristics as a closed region.

In this embodiment, a characteristic of each of the pixels in the multi-valued image is an edge. In other words, in this embodiment, the controller 10 assumes that a region formed by edge pixels being continued, a region formed by non-edge pixels not constituting an edge being continued, and the like are recognized as objects. The controller 10 detects an edge in the multi-valued image by the function of the binarization unit 11b, and identifies a closed region based on the edge. Specifically, the controller 10 scans the inside of the multi-valued image while taking every pixel in the multi-valued image as a pixel of interest, and identifies whether or not the pixel of interest is an edge. Whether or not the pixel is an edge may be determined by various kinds of processing. For example, it is possible to adopt a configuration in which the controller 10 identifies a distribution range (e.g., standard deviation, variance, or the like) of luminance in the pixel of interest and pixels around the pixel, of interest, and determines that the pixel of interest is an edge when the distribution range is larger than a reference value.

Figure 7:
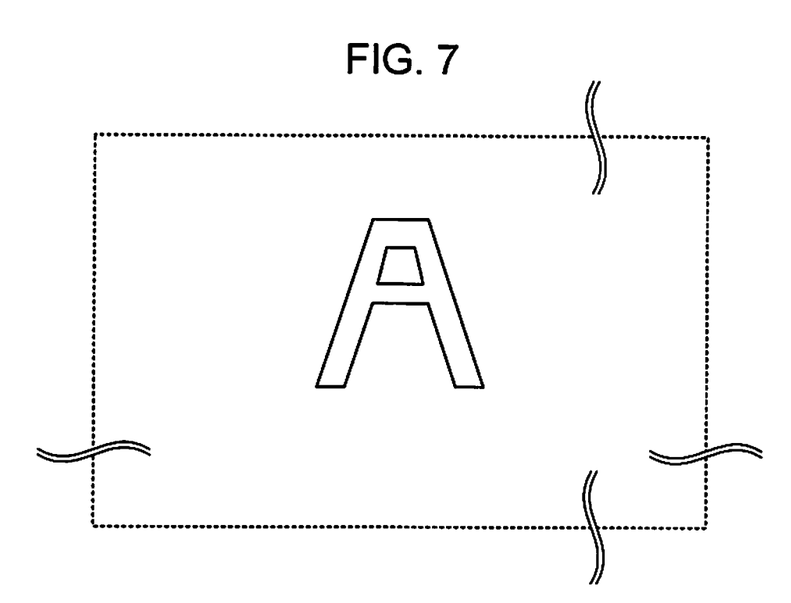
FIG. 7 is a diagram schematically illustrating a multi-valued image including an outline character "A".
Figure 8:
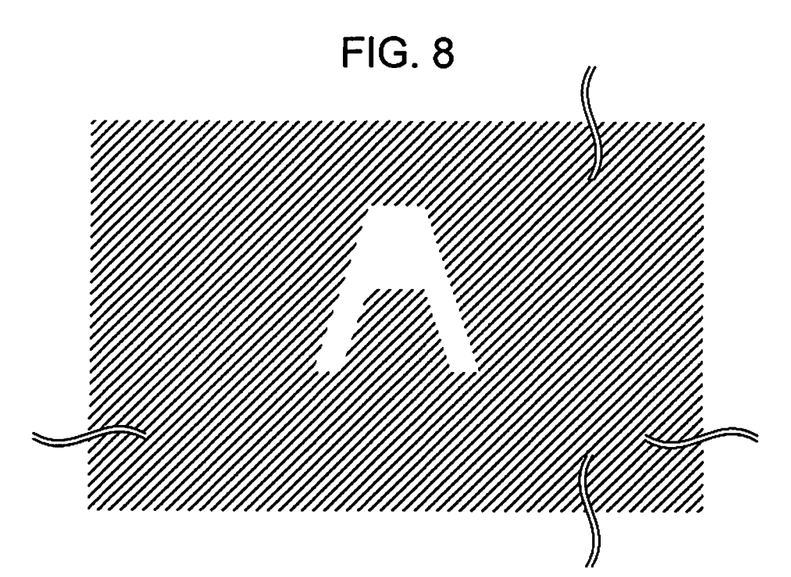
FIG. 8 is a diagram illustrating an extracted closed region.
Figure 9:
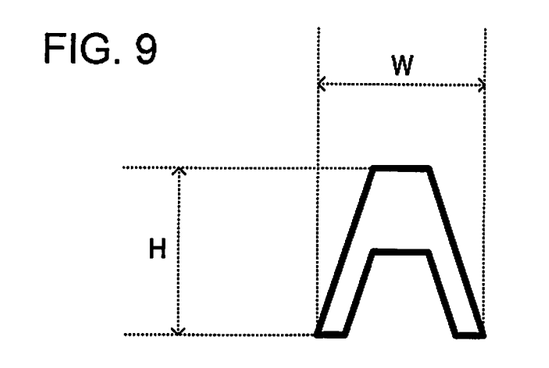
FIG. 9 is a diagram illustrating an extracted closed region.
Figure 10:
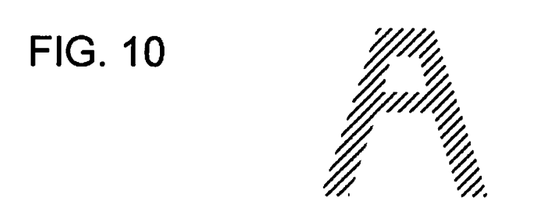
FIG. 10 is a diagram illustrating an extracted closed region.
Figure 11:
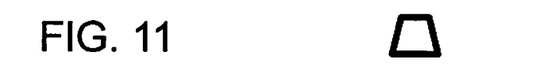
FIG. 11 is a diagram illustrating an extracted closed region.
Figure 12:
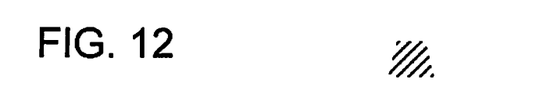
FIG. 12 is a diagram illustrating an extracted closed region.

When the edge pixels and the non-edge pixels are identified, the controller 10 detects, as a closed region, the region formed by the continuous edge and the region formed by the non-edge pixels not constituting an edge being continued, using the function of the binarization unit lib. FIGS. 8 to 12 each illustrate an example of a closed region extracted from an outline character and its periphery (a range indicated by a broken line) illustrated in FIG. 7. Although there is no actual broken line on the document, a broken line is provided here only for indicating the range. In addition, since the broken line in a lengthwise direction is reduced, such a state is assumed that, in reality, a region of the periphery of the outline character has a wider range. In this embodiment, in the case of an outline character, as illustrated in FIG. 7, a boundary line of the character is extracted as an independent closed region as illustrated in FIG. 9 and FIG. 11, and the periphery and the inside of these closed regions are extracted as an independent closed region as illustrated in FIGS. 8, 10, and 12, respectively.

In this embodiment, since a closed region is identified in a region where edge pixels continue and a region where non-edge pixels continue, no non-edge pixel is included in a closed region identified based on the edge pixels. Therefore, in the case of an outline character A as illustrated in FIG. 7, a boundary line as illustrated in FIG. 9 is defined as a closed region; however, non-edge pixels existing inside the boundary line of the character A (e.g., FIG. 10), and edge pixels existing inside the boundary line while being discontinued with the boundary line (e.g., FIG. 11) are regarded as another closed region. Further, if there is no edge pixel outside the boundary of the character A and non-edge pixels continuously exist across to the boundary of the reading range of the document, a portion corresponding to the background of the character or the like (e.g., FIG. 8) may form an independent closed region. Specific processing for extracting closed regions will be described in detail later.

When the closed regions are acquired, the controller 10 determines a threshold value of each closed region based on the luminance inside the closed region and the luminance around the closed region using the function of the binarization unit 11b, and binarizes the inside of each closed region based on the determined threshold value. That is, each of the closed regions refers to a portion (boundary, inside, or the like) of an object (parts of a character and the like), the background of the object, or the like, and it is important that an object to be read is converted into a color different from that of the peripheral region in the binarization.

In addition, in the case where the closed region is an object to be read, the stated closed region has a characteristic shape. For example, parts of a character and the like are generally smaller than a document. Further, parts of the character and the like are generally thin. Therefore, in the present embodiment, the closed region having these characteristics is considered likely to be an object to be read, and the threshold value of the closed region is determined taking into consideration the luminance inside the closed region and the luminance around the closed region.

In other words, the controller 10 determines whether or not the closed region is smaller than the reference size or thinner than the reference shape using the function of the binarization unit 11b. In the case where the closed region is smaller than the reference size or thinner than the reference shape, the controller 10 determines a threshold value based on the luminance inside the closed region and the luminance around the closed region, and binarizes the inside of the closed region based on the determined threshold value. Then, the controller 10, when determining a threshold value based on the luminance, determines the threshold value in such a manner as to make the major portion of the closed region black when the luminance of the major portion inside the closed region is darker than the luminance around the closed region. In the case where the luminance of the major portion inside the closed region is brighter than the luminance around the closed region, the controller 10 determines a threshold value in such a manner as to make the major portion of the closed region be white. According to this configuration, it is possible to determine the threshold value so that the inside of the closed region has a color opposite to that of the periphery.

On the other hand, in the case where the closed region is larger than the reference size and is thicker than the reference shape, the controller 10 determines a threshold value based on the luminance inside the closed region without referring to the luminance around the closed region, and binarizes the inside of the closed region based on the determined threshold value. That is, in the case where the closed region is larger than the reference size and is thicker than the reference shape, the closed region is considered unlikely to be an object to be read, and the threshold value is simply determined by paying attention to the inside of the closed region. Needless to say, in the case where it is unnecessary to take into consideration the easiness, load, and the like of the processing, the threshold value may be determined taking into consideration the luminance around the closed region even when the closed region is unlikely to be an object to be read. In addition, to make it more easy, a fixed threshold value may be used.

It is sufficient for the reference size to be a size that is likely to be an object to be read. For example, the reference size may be determined by statistically determining a size to be regarded as an object such as a character based on a document size, or the like. It is sufficient for the reference shape to be a shape that is likely to be an object to be read. For example, the reference shape may be determined by statistically determining a shape to be regarded as an object such as a character based on the document size, or the like.

When the threshold value is determined as described above, the controller 10 binarizes the pixels in each closed region based on the threshold value of the pixel in each closed region. According to the above configuration, it is possible to change a binarization threshold value based on the luminance inside the closed region and the luminance around the closed region, and it is possible to binarize the major portion inside the closed region without the major portion being merged with its periphery.

Further, according to the present embodiment, since it is specified, based on the characteristics of the shape of each of the closed regions, whether or not the threshold value should be determined based on the luminance around the closed region, it is possible to increase the possibility that an object to be read can be binarized being differentiated from the peripheral region. Furthermore, a closed region which is unlikely to be an object can be binarized by a simple method, which does not refer to the luminance of the periphery. This makes it possible to simplify the processing.

2. Binarization Processing

Figure 2:
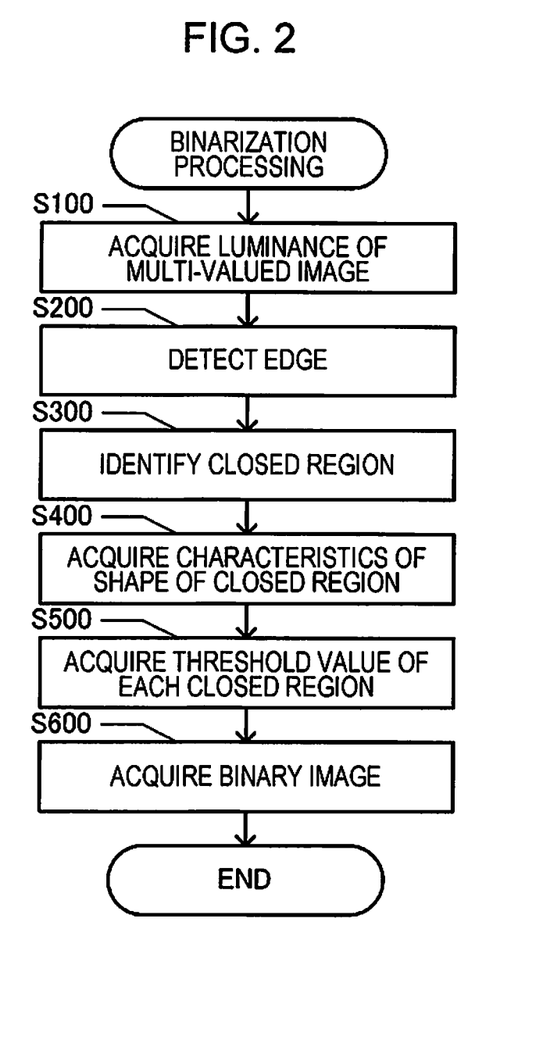
FIG. 2 is a flowchart illustrating binarization processing.

Next, the binarization processing in the above-discussed configuration will be described in detail. FIG. 2 is a flowchart illustrating the binarization processing. The binarization processing is started, when a user operates and instructs the UI unit 30 to read and binarize a document, in a state in which the multi-valued image data 20a is recorded in the memory 20. When the binarization processing is started, the controller 10 acquires the luminance of the multi-valued image by the function of the binarization unit 11b (step S100). In other words, the controller 10 acquires the multi-valued image data 20a from the memory 20, and converts the tone value for each color channel of each pixel into luminance of each pixel. Various methods can be employed as a method for converting the tone value for each color channel into luminance. For example, the conversion can be carried out by a formula such as Y=(30×R+59×G+11×B)/100. Here, Y is luminance, R is a tone value of a red channel, G is a tone value of a green channel, and B is a tone value of a blue channel.

Next, the controller 10 detects an edge by the function of the binarization unit 11b (step S200). In other words, the controller 10 scans the inside of the multi-valued image taking each pixel of the multi-valued image as a pixel of interest, and calculates luminance variance of each pixel of interest. For example, the luminance variance can be calculated as represented by Formula 2 using Formula 1.

$$Yu = \frac{1}{5 \times 5} \sum_i^5 \sum_j^5 Y(x_i, y_j) \quad (1)$$

$$Yv = \frac{1}{5 \times 5} \sum_i^5 \sum_j^5 \{Y(x_i, y_j) - Yu\}^2 \quad (2)$$

In these formulas, pixels present in a range of two pixels on the upper and lower sides and two pixels on the right and left sides of the pixel of interest are peripheral pixels of the pixel of interest, and a statistical value is calculated for a total of 5×5 pixels. To be specific, Yu is a luminance average, i and j are symbols for indicating a position of a pixel, and $x_i$ and $y_3$ indicate a position of a pixel. The position of the pixel of interest is $x_3$ and $y_3$, and Yv is luminance variance. The luminance variance indicates an extent of the distribution range of luminance in a region of the total of 5×5 pixels.

Then, the controller 10 compares the luminance variance with a predetermined reference value, and considers the pixel of interest as an edge pixel in the case where the luminance variance is equal to or larger than the reference value. In the case where the luminance variance is smaller than the reference value, the controller 10 considers the pixel of interest as a non-edge pixel. In the case where there is no other pixel in a range of two pixels on the upper and lower sides and on the right and left sides of the pixel of interest, the stated pixel is ignored and the value of a normalization constant in Formulas 1 and 2 is adjusted. Further, determining whether or not the pixel of interest is an edge may be carried out by other various methods. For example, various types of edge detection filters or the like may be used.

Next, the controller 10 identifies a closed region by the function of the binarization unit 11b (step S300). That is, the controller 10 refers to the edges detected in step S200, identifies, as one closed region, a region in which edges are continued, and identifies, as a closed region, a region in which non-edges are continued; this processing is performed on all the pixels.

Identification of the closed region may be carried out by various methods. In this embodiment, identification of a closed region is carried out by allocating a region label to each pixel based on a filter. Here, the region label is a value indicating whether or not the closed region is the identical closed region, and the identical label is assigned to the identical closed region. That is, a label indicating a closed region to which each of the pixels belongs, is assigned to each of the pixels.

Figure 3:
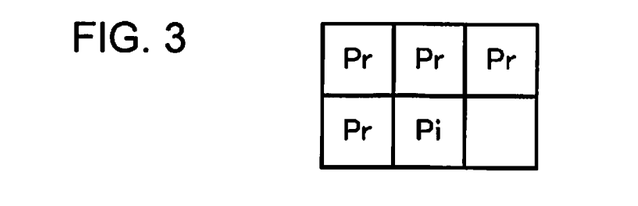
FIG. 3 is a diagram illustrating a filter for allocating region labels.
Figure 4:
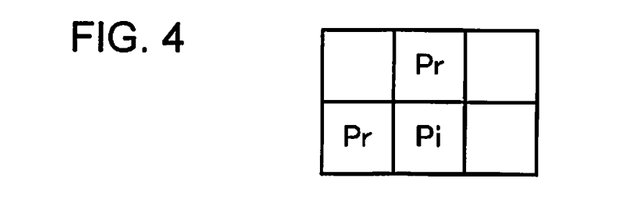
FIG. 4 is a diagram illustrating a filter for allocating the region labels.

FIGS. 3 and 4 illustrate filters used for allocating region labels. In the drawings, a pixel is represented by a square, a position of a pixel of interest is represented by Pi, and a position of a reference pixel is represented by Pr. FIG. 3 illustrates a filter to be applied in a case of a pixel of interest being an edge pixel, while FIG. 4 illustrates a filter to be applied in a case of a pixel of interest being a non-edge pixel. For example, in the case where the pixel of interest is an edge pixel, since the filter illustrated in FIG. 3 is applied to the pixel of interest, pixels located on the left, upper left, upper, and upper right of the pixel of interest become reference pixels. In the case where the pixel of interest is a non-edge pixel, since the filter illustrated in FIG. 4 is applied to the pixel of interest, pixels located on the left and upper of the pixel of interest become reference pixels. A difference between the above filters is generated due to the following reason: in the case of edge pixels, it is intended to determine a closed region by putting an emphasis on continuity of the edge, while in the case of non-edge pixels, it is intended to determine a closed region by putting an emphasis on separability of the non-edge. In the case where no reference pixel exists, the determination on that pixel is not made.

The controller 10 allocates a region label with reference to a result of step S200 for each pixel. In other words, the controller 10 scans the whole image while taking every pixel as a pixel of interest. In this embodiment, the region label is an integer of 1 or more, and the initial value thereof is 1 (one). For example, in the case where the scanning of pixels of interest starts from an upper left pixel and moves to the right by one pixel each and when the scanning reaches the right end, then the scanning moves to a pixel at the left end of a lower line by one pixel, the region label of the upper left pixel takes the initial value of 1. When a different closed region is found, a value obtained by adding 1 (one) to the maximum value of the existing region labels is allocated to the different closed region.

Figure 5:
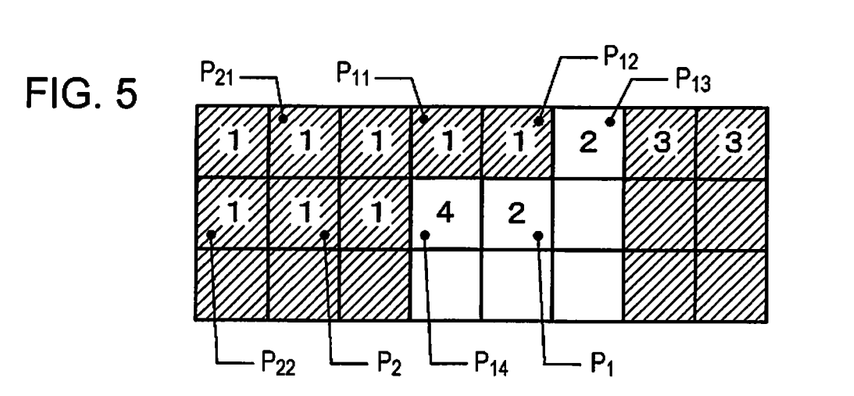
FIG. 5 is a diagram illustrating an edge state of a pixel.

Specifically, in the process of scanning, the controller 10 determines whether the pixel of interest is an edge pixel or a non-edge pixel, and selects the filter illustrated in FIG. 3 when the pixel of interest is an edge pixel or the filter illustrated in FIG. 4 when the pixel of interest is a non-edge pixel. FIG. 5 schematically illustrates an edge state of a pixel, where an outline rectangle indicates an edge pixel and a hatched rectangle indicates a non-edge pixel. Therefore, for example, when a pixel $P_1$ becomes a pixel of interest, the filter illustrated in FIG. 3 is selected, and when a pixel $P_2$ becomes a pixel of interest, the filter illustrated in FIG. 4 is selected.

When the filter of the pixel of interest is selected, the controller 10 sets a region label of the pixel of interest based on the region labels of the reference pixels. Specifically, the controller 10 extracts a pixel with the same edge state as that of the pixel of interest from among the reference pixels, and regards the extracted pixel as a region label identification source. In other words, in the case where the pixel of interest is an edge pixel, the controller 10 extracts an edge pixel from among the reference pixels and regards the extracted pixel as a region label identification source. In the case where the pixel of interest is a non-edge pixel, the controller 10 extracts a non-edge pixel from among the reference pixels and regards the extracted pixel as a region label identification source.

For example, in the case where the pixel $P_1$ illustrated in FIG. 5 is a pixel of interest, since the pixel $P_1$ is an edge pixel, the controller 10 extracts, from among reference pixels $P_{11}$, $P_{12}$, $P_{13}$ and $P_{14}$, the pixels $P_{13}$ and $P_{14}$ which are edge pixels, and regards the extracted pixels as a region label identification source. In the case where the pixel $P_2$ is a pixel of interest, since the pixel $P_2$ is a non-edge pixel, the controller 10 extracts, from pixels $P_{21}$ and $P_{22}$, the pixels $P_{21}$ and $P_{22}$ which are non-edge pixels, and regards the extracted pixels as a region label identification source.

When the region label identification source is extracted, the controller 10 compares the region labels allocated to the pixels in the region label identification source, acquires a minimum value, and considers the acquired value as a value of the region label of the pixel of interest. For example, in the case where the pixel $P_1$ is a pixel of interest and the pixels $P_{13}$ and $P_{14}$ are extracted as a region label identification source, the controller 10 acquires a minimum value of 2 in the region labels 2 and 4, and sets the region label of the pixel $P_1$ to 2. In the case where the pixel $P_2$ is a pixel of interest and the pixels $P_{21}$ and $P_{22}$ are extracted as a region label identification source, the controller 10 acquires a minimum value of 1 among the region labels 1 and 1, and sets the region label of the pixel $P_2$ to 1.

As a closed region becomes larger during the processing described above, a situation may occur in which different region labels are allocated to the same closed region. For example, in an example illustrated in FIG. 5, different region labels 2 and 4 are respectively allocated to the pixels $P_{13}$ and $P_{14}$ belonging to the same closed region. As such, in order to correct this situation, if the region labels of the pixels in the region label identification source do not match each other, the controller 10 corrects the region label to the minimum region label. For example, the controller 10 corrects the region label of the pixel $P_{14}$ from 4 to 2. This correction may be performed during the process of scanning or after the scanning having been ended.

By the above-described processing, it is possible to allocate the identical region label to each of the edge pixels in the case where the edge pixels continue, and to allocate the identical region label to each of the non-edge pixels in the case where the non-edge pixels continue. However, in the process of scanning the pixels of interest as discussed above, there occurs a case in which a region label identification source is not extracted in some case. For example, when the pixel $P_{13}$ becomes a pixel of interest during the process of scanning the pixels from left to right, no reference pixel exists on the upper left, upper, and upper right of the pixel of interest. In addition, the reference pixel $P_{12}$ existing on the left of the pixel of interest is a non-edge pixel, and the pixel of interest $P_{13}$ is an edge pixel.

Figure 6:
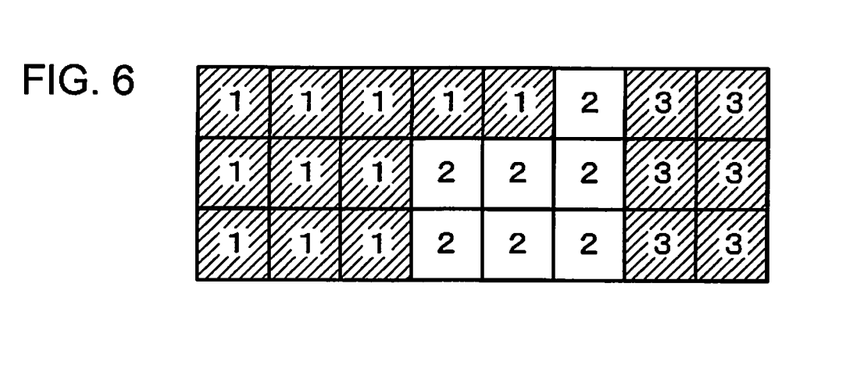
FIG. 6 is a diagram illustrating allocation of the region labels.

Therefore, a region label identification source is not extracted from the reference pixel of the pixel of interest $P_{13}$. In this case, the controller 10 considers that the pixel of interest belongs to a closed region different from the existing closed region, and allocates a value obtained by adding 1 (one) to the maximum value of the existing region label. For example, at a stage of processing the pixel of interest $P_{13}$, since the maximum value of the existing region label is 1, the controller 10 allocates a region label of 2 to the pixel of interest $P_{13}$. FIG. 6 illustrates an example of region labels having been allocated when the scanning of each of the pixels illustrated in the example of FIG. 5 is ended. According to the processing discussed above, as illustrated in FIG. 6, the consecutive edge pixels can be defined as an identical closed region and the consecutive non-edge pixels can be defined as another identical closed region, which make it possible to identify the closed regions with ease. In addition, in the present embodiment, since an edge is detected based on luminance variance and a closed region is identified based on the detected edge, it is possible to recognize an object with a small luminance change like a character light in color, as the identical closed region. Therefore, it is possible to reduce a possibility that an object disappears or is divided at the time of binarization.

When a closed region is detected, the controller 10 acquires characteristics of the shape of the closed region by the function of the binarization unit 11b (step S400). FIG. 7 schematically illustrates a multi-valued image including the outline character A. In this example, when the processing in step S300 is carried out, a plurality of closed regions are identified as illustrated in FIGS. 8 to 12. In FIG. 8, a closed region existing around the character A is illustrated by hatching. In FIG. 9, a closed region formed by an edge constituting an outer boundary of the character A is indicated by a thick solid line. In FIG. 10, a closed region existing inside the outer boundary of the character A is indicated by hatching. In FIG. 11, a closed region formed by an edge constituting an inner boundary of the character A is indicated by a thick solid line. In FIG. 12, a closed region existing inside the inner boundary of the character A is indicated by hatching.

When the processing in step S300 is carried out, the plurality of closed regions are identified, where region labels are allocated to each of the closed regions, as illustrated in FIGS. 8 to 12. Here, in particular, focusing on the closed region illustrated in FIG. 9, characteristics of the shape of the closed region will be described. In this embodiment, characteristics of the shape of each of the closed regions are identified based on a rectangle circumscribing each closed region and the number of pixels in the closed region. Then, the controller 10 identifies a rectangle circumscribing each of the closed regions having been identified in step S300, and identifies lengths of two sides of the rectangle. In FIG. 9, the length of one of the two sides (a side parallel to an x-direction) is represented as a width W, and a length of the other one of the two sides (a side parallel to a y-direction) is represented as a height H. In this example, the controller 10 identifies the width W and the height H.

Further, the controller 10 acquires the number of pixels of each of the closed regions having been identified in step S300. In other words, the controller 10 counts the number of pixels to which the identical region label is allocated, thereby acquiring the number of pixels of the closed region to which each of the region labels is allocated. Furthermore, the controller 10 collects information relating to the closed region in order to carry out processing of acquiring a threshold value later. Specifically, the controller 10 identifies the region label of the closed region adjacent to each of the closed regions, and records the identified region label in association with each of the closed regions in the memory 20. Accordingly, the controller 10 can identify a closed region adjacent to each of the closed regions by referring to the memory 20. Moreover, the controller 10 acquires an average value, a mode, and a luminance histogram of the luminance in the closed region based on the luminance of each of the closed regions, and records them in the memory 20.

Next, the controller 10 acquires a threshold value of each closed region by the function of the binarization unit 11b (step S500). In this embodiment, a threshold value is acquired based on the size and shape of the closed region, and the controller 10 considers the size of a rectangle circumscribing each closed region (the width W and height H acquired in step S400) as the size of the closed region.

An object to be read, such as a character, is generally smaller than a document; as such, in this embodiment, a reference size by which an object is considered to be small is defined in advance as a first reference and a second reference. The controller 10 carries out processing in which, in the case where the width W of a circumscribing rectangle is less than the first reference and the height H of the circumscribing rectangle is less than the second reference, the corresponding closed region is determined to be small, for each of the closed regions. According to the above-described configuration, it is possible to easily identify a closed region which should not be merged with the peripheral region by binarization. Note that the first reference and the second reference may be fixed values determined in advance, may be variable values that vary depending on the size of the document or the like, or may be values specified by a user or the like. Needless to say, the first reference and the second reference may be equal to or different from each other.

Further, the shape of an object to be read, such as a character, is often constituted by thin parts. Thus, in the present embodiment, whether or not an object is thin is evaluated based on a ratio of the vertical length to the horizontal length of a rectangle circumscribing the closed region, and is also evaluated based on a ratio of an area of the closed region to an area of the rectangle circumscribing the closed region.

That is, it can be estimated that the closed region is thinner as the ratio of the vertical length to horizontal length of the rectangle circumscribing the closed region is smaller or larger than 1 (one). Then, the controller 10 acquires a ratio of the vertical and horizontal lengths of a rectangle circumscribing the closed region such that the ratio becomes no more than 1 (one) in which a larger one among the width W and the height H of the rectangle circumscribing each of the closed regions is taken as a denominator and a smaller one among them is taken as a numerator.

Figure 13:
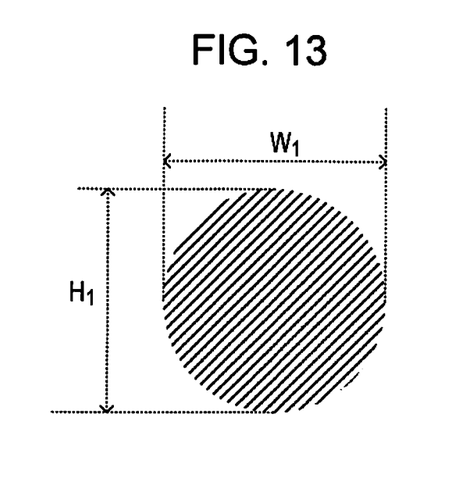
FIG. 13 is a diagram illustrating a ratio of an area of a closed region to an area of a rectangle circumscribing the closed region.
Figure 14:
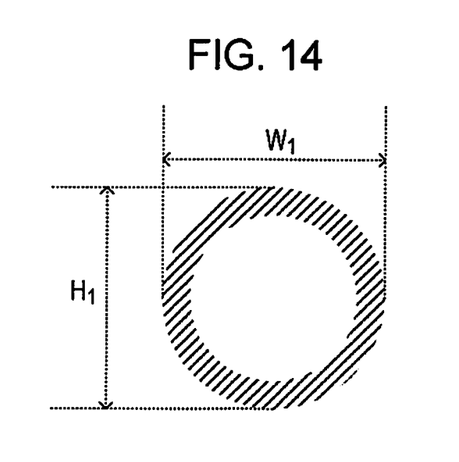
FIG. 14 is a diagram illustrating a ratio of an area of a closed region to an area of a rectangle circumscribing the closed region.

Further, as the ratio of the area of the closed region to the area of the rectangle circumscribing the closed region is smaller or larger than 1 (one), it can be estimated that the closed region is thinner. Each of FIGS. 13 and 14 is a diagram for explaining a ratio of an area of a closed region to an area of a rectangle circumscribing the closed region, and the closed region is indicated by hatching. Furthermore, FIG. 13 illustrates an example of a circular closed region, and FIG. 14 illustrates an example of an annular closed region. In the examples illustrated in FIGS. 13 and 14, sizes of rectangles circumscribing the respective closed regions are equal to each other, and both the rectangles have a width $W_1$ and a height $H_1$.

In these examples, the annular closed region illustrated in FIG. 14 is constituted by a thin line, and the circular closed region illustrated in FIG. 13 is constituted by the inside of a circular circumference thereof being filled with the same characteristics (e.g., non-edges). In the example illustrated in FIG. 13, the area of the closed region is an area of a circle, and the area of the rectangle circumscribing the closed region is obtained by a calculation of $W_1 \times H_1$. In the example illustrated in FIG. 14, the area of the closed region is an area of an annular portion, and the area of the rectangle circumscribing the closed region is obtained by a calculation of $W_1 \times H_1$. Accordingly, when comparing the ratios of the above two examples, i.e., the ratios each expressed as (the area of the closed region)/(the area of the rectangle circumscribing the closed region), the value of the ratio tends to increase in the closed region that is not constituted by a thin line as illustrated in FIG. 13, while the value of the ratio tends to decrease in the closed region that is constituted by a thin line as illustrated in FIG. 14.

Then, the controller 10 acquires a ratio of the area of the closed region to the area of the rectangle circumscribing the closed region in such a manner as to make the ratio equal to or less than 1 (one) by dividing the number of pixels indicating the area of each closed region by the area of the rectangle circumscribing the closed region (W×H).

As described above, whether or not an object is thin can be evaluated based on a ratio of the vertical length to the horizontal length of a rectangle circumscribing the closed region, and can also be evaluated based on a ratio of the area of the closed region to the area of the rectangle circumscribing the closed region. These ratios may be evaluated individually or both the ratios may be evaluated simultaneously. In this embodiment, the latter is adopted, and the controller 10 calculates the product of the above two ratios, and compares the product with a shape threshold indicating the reference shape. That is, when Formula 3 below is satisfied, the controller 10 determines that the closed region is thinner than the reference shape.

$$C_S \times C_{WH} < C_{th} \qquad (3)$$

In Formula 3, $C_S$ is a ratio of an area of a closed region to an area of a rectangle circumscribing the closed region, and $C_{WH}$ is a ratio of vertical length to horizontal length of the rectangle circumscribing the closed region. $C_{th}$ is a shape threshold used for determining whether or not the shape is a reference shape, and is defined beforehand by statistics or the like so that the closed region can be regarded as having a thin shape when the value of $C_S \times C_{WH}$ is less than $C_{th}$. The controller 10 carries out processing in which, in the case where Formula 3 is satisfied, the closed region is determined to be thinner than the reference shape for each of the closed regions. According to this configuration, it is possible to easily identify a closed region that should not be merged with the peripheral region by binarization.

As described above, when determinations are made, for each closed region, on whether or not the closed regions is smaller than the reference size and whether or not the closed region is thinner than the reference shape, the controller 10 determines a threshold value for each closed region based on these determination results. Specifically, when the closed region is larger than the reference size and thicker than the reference shape, the controller 10 determines the threshold value based on the luminance inside the closed region without referring to the luminance around the closed region. To be specific, in the case where an average value of a luminance histogram inside the closed region is taken as $Y_{ave}$ and a mode value thereof is taken as $Y_m$, the controller 10 sets an expression of $Y_{ave}-(Y_m-Y_{ave})$ as a threshold value $Y_{th}$.

Figure 15:
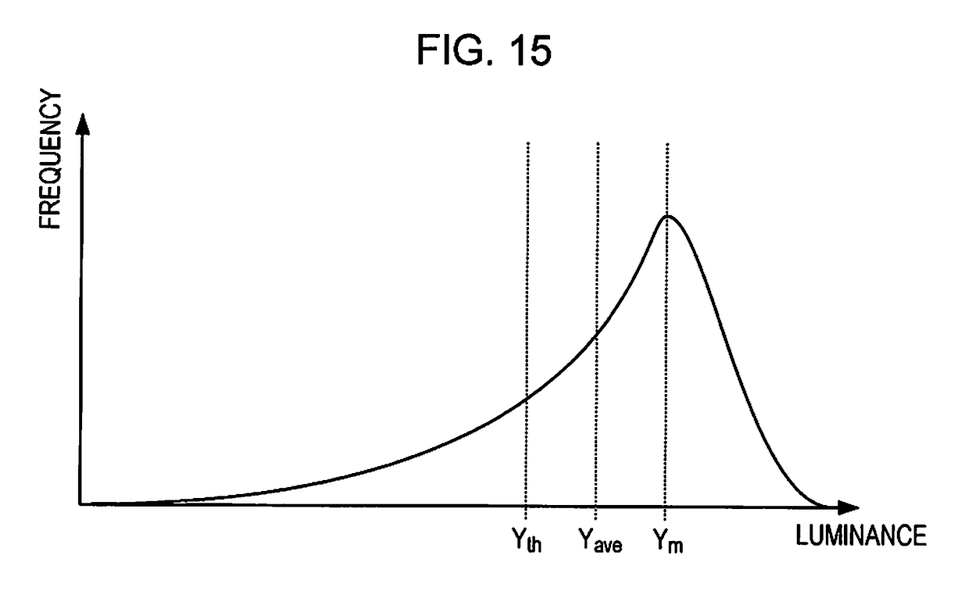
FIG. 15 is a graph showing an example of a luminance histogram of a closed region in a case where the closed region is larger than a reference size and thicker than a reference shape.

FIG. 15 shows a luminance histogram of a closed region when the closed region is larger than a reference size and is thicker than a reference shape (e.g., a luminance histogram of the closed region illustrated in FIG. 8). When the closed region is larger than the reference size and is thicker than the reference shape, there is a high possibility that the closed region is not an object such as a character but a background or the like. Therefore, if the most of the pixels constituting the luminance histogram can be converted into white, there is a high possibility that the binarization is appropriately carried out. The expression of $Y_{ave}-(Y_m-Y_{ave})$ which refers to the threshold value $Y_{th}$, is a threshold value for converting the most of the portions into white, as illustrated in FIG. 15. Therefore, when the closed region is binarized with this threshold value, it is possible to increase a possibility that a background or the like can be binarized so as to be visually recognized as the background or the like.

When the binarization is carried out with the threshold value determined as described above, in a case where an object having a color close to a ground color of the document exists, the object is undesirably merged with the peripheral region by binarization. Accordingly, in this embodiment, in the case where the closed region is smaller than the reference size or is thinner than the reference shape, the threshold value is determined also by referring to the luminance around the closed region.

Specifically, in the case where the closed region is smaller than the reference size or is thinner than the reference shape, the controller 10 determines the threshold value so as to blacken the major portion of the closed region when the luminance of the major portion inside the closed region is darker than the luminance around the closed region. That is, in the case where the controller 10 determines the threshold value by focusing on a certain closed region, the controller 10 refers to the memory 20 and acquires a region label of a closed region adjacent to the above closed region. For example, in the example illustrated in FIG. 6, when a closed region of the region label 2 is focused on, the controller 10 acquires the region labels 1 and 3 of adjacent closed regions. Then, based on the region labels, the controller 10 acquires a mode of luminance of the focused closed region and a mode of luminance of the adjacent closed region. Note that, in this embodiment, a pixel having the luminance of the mode inside the closed region corresponds to the major portion inside the closed region.

Further, the controller 10 compares the mode of the luminance of the closed region being focused on, with the mode of the luminance of the adjacent closed region. In the case where there exist a plurality of adjacent closed regions, the controller 10 compares the mode of the luminance of the closed region being focused on, with the modes of all the adjacent closed regions. Then, in the case where the mode of the luminance of the closed region being focused on is smaller than any of the modes of the luminance of all the adjacent closed regions, the threshold value is so determined that a tail portion on a high luminance side of the luminance histogram of the closed region being focused on becomes a first ratio.

Figure 16:
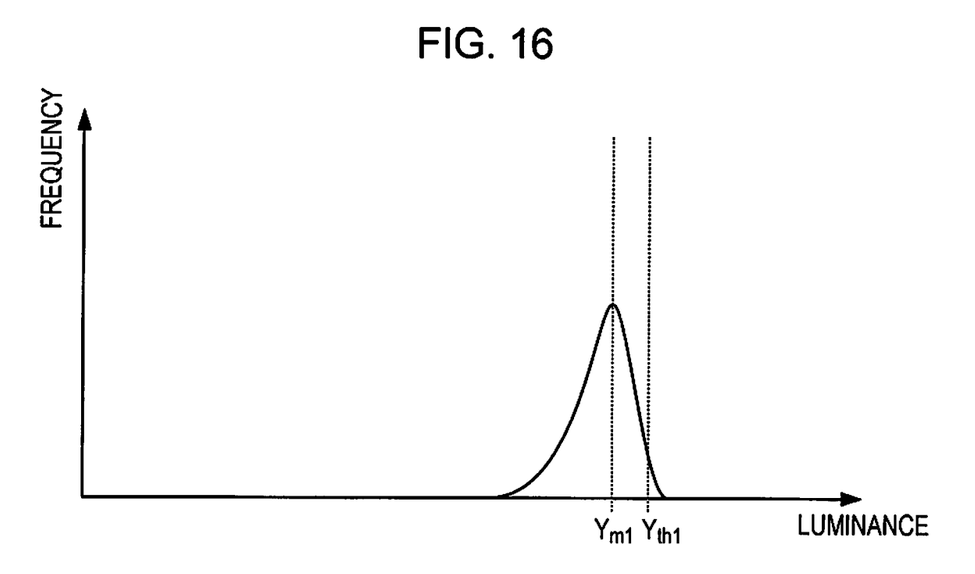
FIG. 16 is an example of a luminance histogram of a closed region formed by a boundary of a character.
Figure 17:
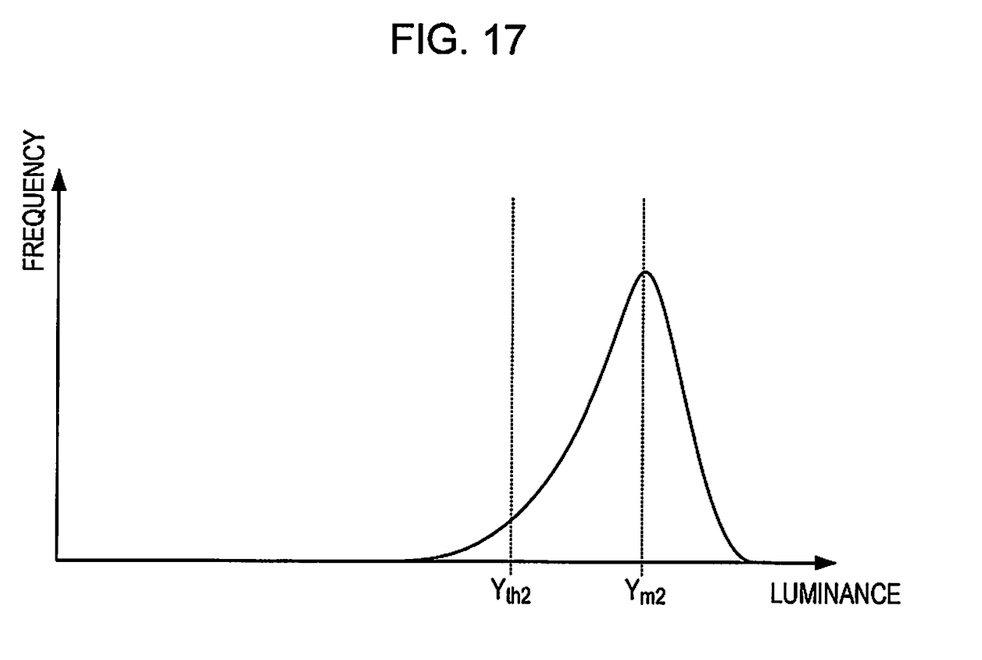
FIG. 17 is an example of a luminance histogram of a bright closed region forming part of an object such as a character.

FIG. 16 shows an example of a luminance histogram of a closed region formed by a boundary of a character (note that a boundary color is close to the ground color). FIG. 17 shows an example of a luminance histogram of a closed region existing around the closed region illustrated in FIG. 16. The luminance histogram of FIG. 16 is, for example, a luminance histogram of the boundary of the character illustrated in FIG. 9, and the luminance histogram of FIG. 17 is, for example, a luminance histogram of the inside of the character illustrated in FIG. 10. Here, attention is focused on the closed region illustrated in FIG. 16, and explanation will be given assuming that, among the closed regions around the above closed region, a closed region with the smallest mode of the luminance histogram is the closed region illustrated in FIG. 17.

In these examples, a mode of the luminance of the closed region being focused on is $Y_{m1}$, and a mode of the luminance of the closed region around the closed region being focused on is $Y_{m2}$. Then, the mode $Y_{m1}$ of the luminance of the closed region being focused on is smaller than the mode $Y_{m2}$ of the luminance of the adjacent closed region. In this case, the controller 10 counts the number of pixels of the tail portion on the high luminance side of the luminance histogram of the closed region being focused on from the high luminance side, and determines the luminance at which an expression of the count value/the number of pixels of the closed region becomes the first ratio as a threshold value. In FIG. 16, a threshold value $Y_{th1}$ thus determined is indicated. Note that the first ratio is determined in advance so that the tail portion on the high luminance side of the luminance histogram takes a considerably small number. In other words, the first ratio is set so that the major portion of the closed region can be made black by the stated threshold value.

On the other hand, in the case where the closed region is smaller than the reference size or is thinner than the reference shape, the controller 10 determines the threshold value so as to whiten the major portion of the closed region when the luminance of the major portion inside the closed region is brighter than the luminance around the closed region. Also in this case, the controller 10 acquires the mode of the luminance of the closed region being focused on and the mode of the luminance of the adjacent closed region.

Further, the controller 10 compares the mode of the luminance of the closed region being focused on with the mode of the luminance of the adjacent closed region. In the case where there exist a plurality of adjacent closed regions, the controller 10 compares the mode of the luminance of the closed region being focused on with the modes of all the adjacent closed regions. Then, in the case where the mode of the closed region being focused on is larger than any of the modes of the luminance of all the adjacent closed regions, the threshold value is determined so that a tail portion on a low luminance side of the luminance histogram of the closed region being focused on becomes a second ratio.

Here, attention is focused on the closed region whose luminance histogram is shown in FIG. 17, and such a state is assumed that the closed region whose luminance histogram is shown in FIG. 16 is a closed region existing around the closed region being focused on. In this example, the mode of the luminance of the closed region being focused on is $Y_{m2}$, and the mode of the luminance of the closed region existing around the closed region being focused on is $Y_{m1}$. Accordingly, the mode $Y_{m2}$ of the luminance of the closed region being focused on is larger than the mode $Y_{m1}$ of the luminance of the adjacent closed region. In this case, the controller 10 counts the number of pixels of the tail portion on the low luminance side of the luminance histogram of the closed region being focused on from the low luminance side, and determines the luminance at which an expression of the count value/the number of pixels of the closed region becomes the second ratio as a threshold value.

In FIG. 17, a threshold value $Y_{th2}$ thus determined is indicated. Note that the second ratio is also determined in advance so that the tail portion on the low luminance side of the luminance histogram takes a considerably small number. In other words, the second ratio is set so that the major portion of the closed region can be made white by the stated threshold value. Note that the second ratio may be equal to or different from the first ratio. Further, each of the ratios may be a fixed value or a variable value which varies according to the luminance histogram or the like.

As described above, the controller 10 carries out processing of acquiring the threshold value of the closed region on each of the closed regions. When the threshold value of each of the closed regions is acquired, the controller 10 acquires a binary image by the function of the binarization unit lib (step S600). In other words, the controller 10 compares the luminance of the pixel in each closed region with the threshold value of each closed region; then, the controller 10 sets the tone value of the pixel whose luminance is larger than the threshold value to 1 (one), and sets the tone value of the pixel whose luminance is equal to or lower than the threshold value to 0 (zero). The controller 10 carries out processing of binarizing the pixels in the closed region in the above manner on each of the closed regions. According to the above configuration, it is possible to binarize an object of a color close to a ground color, such as a thin character, without the object being merged with its peripheral region (e.g., a region of the ground color). In addition, with the configuration in which a threshold value is determined for each closed region, outline characters can be reproduced being whitened.

3. Other Embodiments

The above embodiment is merely an example for carrying out the invention, and various kinds of other embodiments can be employed. For example, a scanner according to an embodiment of the invention may be provided in a multi-function apparatus as an electronic apparatus also used for a purpose other than reading, or the like. Further, the method for determining a binarization threshold value inside a closed region based on luminance around the closed region as in the above embodiments, can also be implemented as an invention of a program, an invention of a method, an invention of a method for generating scan data, and the like. Furthermore, the above-described method can also be implemented as an invention of an apparatus for generating text data and a data generation method, or the like in which processing such as optical character recognition with respect to a character as an object and a bar code conversion with respect to a bar as an object is carried out on the binarized image having been generated as discussed above, so as to generate text data.

In addition, binary image data may be generated by causing at least part of the processing in the controller 10 to be carried out by a driver program or an application program of a computer connected to the scanner 1. In this case, the computer may be considered as part of the scanner.

Moreover, the above embodiments are merely examples, and an embodiment in which part of the configuration is omitted, another configuration is added, or the like may be employed. For example, such a configuration may be employed that the controller 10 does not consider characteristics of a closed region, and binarizes the inside of the closed region based on the luminance inside the closed region and the luminance around the closed region. In addition, such a configuration may be employed that only one ratio between a ratio of vertical length to horizontal length of a rectangle circumscribing a closed region and a ratio of an area of the closed region to an area of the rectangle circumscribing the closed region is taken into consideration when it is to be determined whether or not the closed region is thin.

It is sufficient for the acquisition unit to be capable of acquiring a multi-valued image. In other words, it is only requested for the acquisition unit to be able to acquire an image to be binarized, and as in the above-described embodiments, various images other than an image read by a scanner can become a multi-valued image. For example, such a configuration may be adopted that an image generated by image editing software, an image acquired via a network, or the like is acquired as a multi-valued image to be binarized.

It is sufficient for the binarization unit to be capable of generating a binary image obtained by binarizing a multi-valued image. Since a binary image is a 1-bit image per pixel, the value of a pixel is either 1 (one) or 0 (zero); accordingly, a monochrome image is obtained by making one of 1 and 0 correspond to white and making the other thereof correspond to black. Binarization for a black-and-white monochrome is normally performed; however, needless to say, such a configuration may be employed that the binarization is performed for each color channel (e.g., each of R, G, and B channels) depending on the applications.

In addition, it is sufficient that the closed region detected by the binarization unit is a unit to be binarized by the same reference (e.g., the same threshold value), and is a region formed by, among the pixels of a multi-valued image, pixels having common characteristics being continued. Note that, however, since the region discussed above is a closed region, the inside of the region is not in a state in which pixels having different characteristics are discretely arranged. In the case where pixels having common characteristics are arranged in an annular shape, when pixels having common characteristics are annularly continued, an annular region excluding the inside of the ring becomes a closed region. That is, in the case where pixels of the same characteristics exist separate from each other inside the ring or in the case where pixels of other characteristics exist therein, these pixels may constitute different closed regions.

As for the characteristics, a variety of characteristics can be assumed in addition to the edges as described above. For example, the configuration may be such that a boundary of an object is identified based on a gradient of a multi-valued image, and then a closed region surrounded by the boundary is identified. Further, in addition to the configuration in which a case where pixels having common characteristics are continued is considered as forming a closed region, such a configuration may be employed that a case where pixels having similar characteristics are continued is also considered as forming a closed region.

Further, it is sufficient that the binarization is performed based on the luminance inside a closed region and the luminance around the closed region, and various kinds of configurations may be employed other than the above-described configurations in which a threshold value for the binarization is determined based on the luminance inside the closed region and the luminance around the closed region. For example, processing of making the inside of a closed region white or black based on the luminance inside the closed region and the luminance around the closed region, or the like may be employed.

In addition, when the binarization is performed based on the luminance inside a closed region and the luminance around the closed region, various methods can be employed as a method of taking the luminance into consideration. In other words, various kinds of configurations may be employed in which, as described above, a difference between the luminance inside the closed region and the luminance around the closed region may be taken into consideration, the degree of similarity between the luminance inside the closed region and the luminance around the closed region may be taken into consideration, or the like.

Further, the luminance around a closed region may be luminance of a region outside the stated closed region, may be luminance of a region inside the closed region or may be both the luminance of outside region and the luminance of the inside region in a case where the stated region other than the closed region exists inside the closed region (an annular shape or the like). In the case where a plurality of different closed regions are adjacent to the periphery of the closed region, luminance of one of the different closed regions may be referenced (e.g., a region with the brightest luminance, a region with the darkest luminance, the widest region, or the like), or luminance of each of the plurality of closed regions may be referenced.

It is sufficient for the major portion inside the closed region to be a portion for evaluating the luminance inside the closed region, and various configurations may be adopted other than the configuration in which a pixel whose luminance inside the closed region is equal to the mode is regarded as the major portion like in the above-described embodiments. For example, such a configuration may be adopted that a statistical value of the luminance (an average value or the like) is acquired inside a closed region, and a pixel whose luminance is equal to the statistical value is regarded as the major portion. Needless to say, a pixel whose luminance falls within a certain range (e.g., a range from the statistical value to an expression of standard deviation× constant, or the like) may be regarded as the major portion. In any case, when a closed region is binarized in consideration of an area and characteristics of the closed region, it is sufficient that a portion to be made white or black can be regarded as the major portion. The luminance of the major portion and the luminance around the closed region may be determined by various methods, and the luminance may be evaluated based on various statistical values or the like in addition to the mode.

Characteristics of the shape of a closed region is not limited to the configuration in which the stated characteristics are evaluated in size and thinness as in the above-described embodiments. In other words, it is sufficient that the characteristics of the shape of the closed region can tell whether or not the stated closed region is a portion not to be merged with its periphery by binarization. Accordingly, various configurations can be employed, such as a configuration in which a closed region is binarized to a different value from that of the periphery in a case where, for example, there exists a sharp portion, a jaggy portion, or the like around the closed region.

Further, the invention is applicable to a program executed by a computer, a method, or the like. The program and the method mentioned above include various aspects, that is, they may be implemented as a single device, or implemented by making use of components provided in a plurality of devices. In addition, the aspects of the invention can be appropriately changed in such a manner that part of the aspects is software or part of the aspects is hardware. Further, the invention is also applicable as a recording medium of a program. Needless to say, the recording medium of the program may be a magnetic recording medium, a magneto-optical recording medium, or any recording medium to be developed in the future, which will be supported completely in the same manner.

What is claimed is:

1. An image processing apparatus comprising:
an acquisition unit configured to acquire a multi-valued image; and
a binarization unit configured to generate a binary image obtained by binarizing the multi-valued image,
wherein the binarization unit detects a plurality of closed regions that forms the multi-valued image, with the closed regions each having a plurality of pixels, and
the binarization unit performs binarization of the closed regions to generate the binary image, with the binarization of the closed regions including binarizing a plurality of pixels of at least one of the closed regions by a threshold which is based on both luminance inside the at least one of the closed regions and luminance inside different one of the closed regions that is different from the at least one of the closed regions and in which the pixels of the at least one of the closed regions do not belong.

2. The image processing apparatus according to claim 1, wherein, in a case where luminance of a major portion inside the at least one of the closed regions is darker than the luminance inside the different one of the closed regions, the binarization unit performs binarization to make the major portion of the at least one of the closed regions be black, and
when the luminance of the major portion inside the at least one of the closed regions is brighter than the luminance inside the different one of the closed regions, the binarization unit performs binarization to make the major portion of the at least one of the closed regions be white.

3. The image processing apparatus according to claim 1, wherein the binarization unit binarizes the pixels of the least one of the closed regions based on characteristics of a shape of the at least one of the closed regions.

4. The image processing apparatus according to claim 3, wherein, when the at least one of the closed regions is smaller than a reference size or is thinner than a reference shape, the binarization unit binarizes the pixels of the at least one of the closed regions based on the luminance inside the at least one of the closed regions and the luminance inside the different one of the closed regions, and
when the at least one of the closed regions is larger than the reference size and is thicker than the reference shape, the binarization unit binarizes the pixels of the at least one of the closed regions based on the luminance inside the at least one of the closed regions without referring to the luminance inside the different one of the closed regions.

5. The image processing apparatus according to claim 4, wherein, in a case where a width or a height of a rectangle circumscribing the at least one of the closed regions is less than a first reference and another width or another height of the rectangle is less than a second reference, the binarization unit determines the at least one of the closed regions to be smaller than the reference size.

6. The image processing apparatus according to claim 5, wherein the binarization unit determines whether or not the at least one of the closed regions is thinner than the reference shape based on a ratio of the width to the height of the rectangle.

7. The image processing apparatus according to claim 5, wherein the binarization unit determines whether or not the at least one of the closed regions is thinner than the reference shape based on a ratio of an area of the at least one of the closed regions to an area of the rectangle.

8. The image processing apparatus according to claim 1, wherein the binarization unit determines a pixel of interest to be an edge in a case where a luminance distribution range in the pixel of interest and pixels around the pixel of interest is larger than a reference value, and detects the at least one of the closed regions based on the determined edge.

9. The image processing apparatus according to claim 1, wherein the binarization unit identifies, as the at least one of the closed regions, a region formed by a continuous edge and a region in which non-edge pixels, which are not the edge, are continuously formed.

10. A binary image production method for acquiring a multi-valued image and producing a binary image obtained by binarizing the above multi-valued image, the method comprising:
    detecting a plurality of closed regions that forms the multi-valued image, with the closed regions each having a plurality of pixels; and
    performing binarization of the closed regions to generate the binary image, with the binarization of the closed regions including binarizing a plurality of pixels of at least one of the closed regions by a threshold which is based on both luminance inside the at least one of the closed regions and luminance inside different one of the closed regions that is different from the at least one of the closed regions and in which the pixels of the at least one of the closed regions do not belong.

11. A non-transitory computer-readable medium with an image processing program causing a computer to function as an acquisition unit configured to acquire a multi-valued image, and a binarization unit configured to generate a binary image obtained by binarizing the multi-valued image,
    wherein the image processing program further causes the computer to function in such a manner that the binarization unit
        detects a plurality of closed regions that forms the multi-valued image, with the closed regions each having a plurality of pixels, and
        performs binarization of the closed regions to generate the binary image, with the binarization of the closed regions including binarizing a plurality of pixels of at least one of the closed regions by a threshold which is based on both luminance inside the at least one of the closed regions and luminance inside different one of the closed regions that is different from the at least one of the closed regions and in which the pixels of the at least one of the closed regions do not belong.

* * * * *